Sept. 17, 1940.  A. HALE  2,215,435
METHOD AND APPARATUS FOR SUBDIVIDING CRUDE RUBBER
Filed April 26, 1938
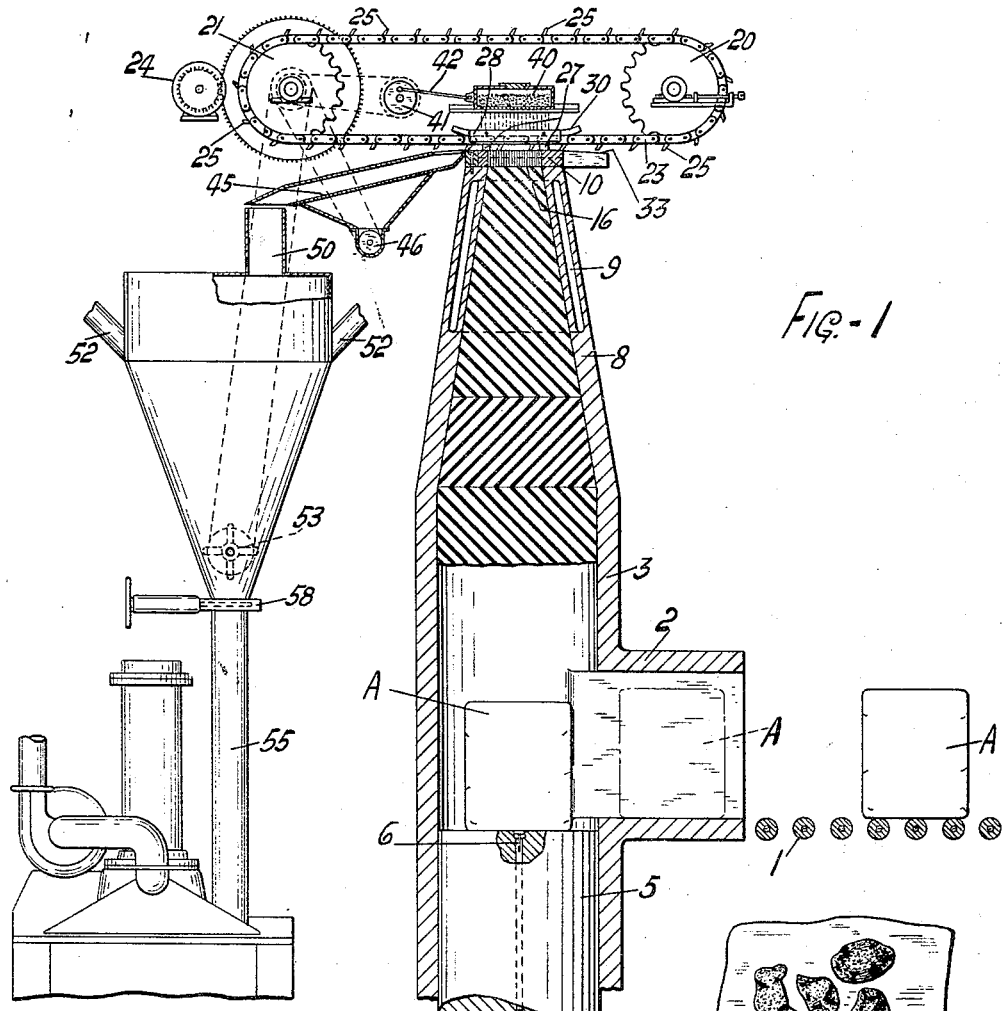
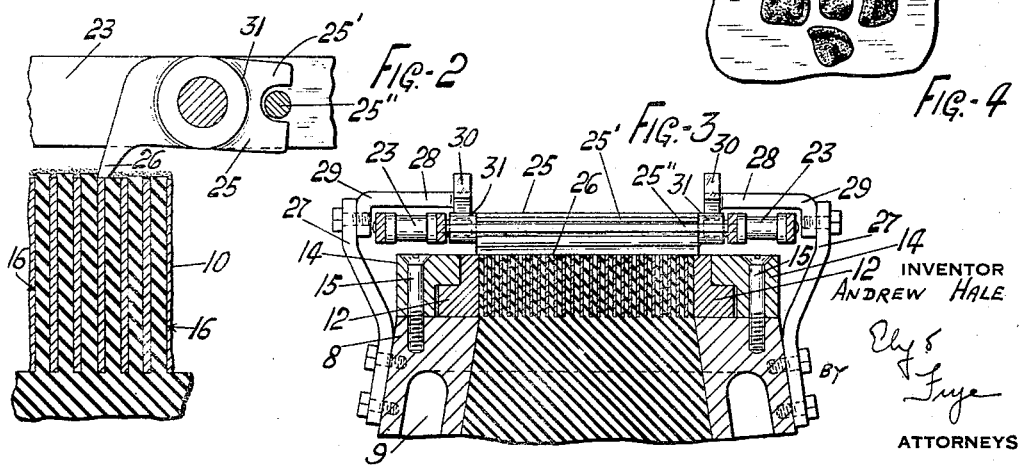
INVENTOR
ANDREW HALE
ATTORNEYS Patented Sept. 17, 1940

2,215,435

UNITED STATES PATENT OFFICE 2,215,435

METHOD AND APPARATUS FOR SUBDIVIDING CRUDE RUBBER

Andrew Hale, Akron, Ohio

Application April 26, 1938, Serial No. 204,345

4 Claims. (Cl. 18—12)

Crude rubber as it is usually received on the market in this country is in the form of bales consisting of a multiplicity of sheets pressed together in a homogeneous mass. In the subsequent manufacturing processes, these bales are cut into large pieces or chunks by well known bale cutters and are then ready for the plasticating or milling processes. The milling processes work and soften the rubber by successive kneading, stretching and rolling operations performed between mill rolls in the well known mixers or mills and, during the process, the necessary pigments, fillers, reagents and other added materials are worked into the rubber. In certain cases preliminary plasticizing operations are performed which soften the rubber and render the mixing and milling less expensive and time consuming.

Milling the rubber in the manner now in universal use is expensive, requiring heavy mills and high power consumption. The operations also tend to break down the nerve of the rubber. It has long been recognized that if the milling operations could be reduced or made easier, the savings in labor, power consumption and depreciation on heavy mill equipment would be correspondingly reduced.

It has also been recognized that if the crude rubber as it is received could be reduced to very small particles the milling operations would be reduced, the distribution and dissemination of the pigments and fillers would be accomplished better and more effectively and other advantages secured. The difficulty heretofore experienced has been due to the inability to devise adequate and operative means or methods of finely dividing the crude rubber. The difficulties have been occasioned chiefly by the properties of the crude rubber. It is very tenacious and sticky and does not yield itself to any of the well known grinding or cutting agencies. If divided into fine particles, these particles immediately seize upon one another and form a sticky adherent mass which is even more difficult to handle than when in its original bale form.

So far as known to me, no one has been successful heretofore in devising a practical and operative process for finely dividing crude rubber, and the present process and apparatus have been the result of long experimentation. The results of the operation illustrated here have proved highly successful. The rubber is successfully formed in fine, thin flakes or particles which do not stick together and can be directly introduced into any well known type of mill internal mixer or plasticator. The fine subdivision of the crude rubber increases the effective area of exposed rubber infinitely beyond the exposed area of the usual blocks cut from bales, so that the process of mixing pigments is greatly facilitated. In addition, the reduction of a batch of rubber into very small bits reduces the work which is required in the milling or plasticizing operations, although the rubber may be given a preliminary plasticizing before being subjected to my process. The term "crude rubber" as used in the specification and claims is intended to cover rubber which is unvulcanized and, therefore, in a tacky condition and is not intended to exclude rubber which may have been given some preliminary treatment. The beneficial results which have been outlined are secured by this process, as will be readily appreciated by those familiar with this art.

The present process is not to be confused with the "refining" of reclaimed rubber stocks as this latter process is essentially a straining operation for the purpose of removing foreign matter from reclaim. Reclaim rubber has been vulcanized and has lost its sticky and tacky condition and, therefore, does not present the problems which have heretofore prevented the successful grinding or subdividing of crude rubber. In the treatment of off-grade rubbers, these rubbers are sometimes strained for the removal of foreign substances, but in such cases the rubber is ordinarily milled or broken down before being strained.

The drawing and description herewith show the best known or preferred form or embodiment of the invention, but this disclosure must be understood to be illustrative merely of the essential features of the invention. It is possible that changes and modifications may be made in specific embodiments of the process and apparatus, all within the scope of the invention as set forth in the appended claims.

The rubber flakes or particles which are the product of the process and apparatus represent a new form of crude rubber which is novel and possesses beneficial properties. They represent a new article of manufacture not known prior to this invention and as a new article of manufacture are covered in a divisional application hereof, Serial No. 333,785, filed May 7, 1940.

In the drawing:

Fig. 1 is a diagrammatic view showing a complete unit for making the flaked crude rubber and is shown in association with a well known or standard type of mill or mixer.

Fig. 2 is an enlarged detail showing the crude rubber as it issues from the extruding plate and showing the manner in which the rubber is cut and the manner in which the dusting powder is applied to the rubber contemporaneously with the cutting operation.

Fig. 3 is a cross-section through one of the knife bearings above the plate and showing the manner in which the plate is secured in position.

Fig. 4 is a detail view showing a number of the flakes, these being illustrative only of certain forms which they assume. The chips or flakes which are formed if the cuts are made with sufficient frequency take all conceivable forms and resemble in size, shape and general appearance the well known "corn-flakes" of commerce.

In the drawing, a bale of rubber, known as the usual "smoked sheets" of commerce, is shown at A. This is a square, bale-like mass of closely packed crude sheets of rubber which adhere together in a solid mass which may be cut into the large chunks or blocks used in the ordinary milling operations. The apparatus shown for treating the rubber while in bale form and reducing it to the flake or particle form is practical and operative, but is not intended to illustrate the sole means by which the subsequent processing may be accomplished as other mechanisms may be employed, it being possible to use other well known means for forcing the rubber through the die.

In the form shown, the bales A, which are usually about 20" x 20" x 24", are received upon an ordinary gravity roller conveyor 1 and are fed one by one into the receiving opening 2 of a vertical cylinder 3 which houses the vertically movable ram 5 which is operated, preferably by hydraulic pressure, so as to secure the heavy pressures which are required to force the crude rubber through the pressure plate to be described.

The newly received bale of rubber rests upon the top of the ram which, on its up stroke, flattens the bale and forces it against the bales which have already been moved into the throat of the cylinder. A number of these bales are shown in the process of compression. A poppet valve 6 is located in the ram so that it may be withdrawn as each successive bale is forced upwardly toward the pressure plate. It may be desirable to have the throat of the cylinder reduced toward the pressure plate, as shown at 8, to reduce the size of the plate so that it may withstand the immense pressures which are required in order to force the rubber through the plate. In order to assist in the process, the discharge end of the cylinder may be jacketed, as at 9, and heated to increase the plasticity of the crude rubber. The amount of pressure and temperature required will depend in a large measure upon the grade of the rubber. These details can be determined by the operatives. The ram forces the rubber through the plate without any kneading or working such as would be caused by a screw feed.

At the discharge end of the cylinder is mounted the die, here shown as a pressure or extrusion plate 10, which is a thick steel plate from two to three inches thick depending upon its size and the pressures which it must withstand to avoid buckling. It is formed with a ledge or rabbet 12 and is held in position by stout clamping plates 14 secured by a plurality of bolts 15 on the end of the cylinder. This is for the purpose of making the plate removable, so that if any foreign matter is in the rubber, the plate can be removed and the rubber forced out of the opening sufficiently to clear the foreign matter. Through the plate are a great number of holes or passages 16 through which the rubber is forced in long strings or filaments resembling spaghetti. While various sizes of holes may be used, it has been found that crude rubber can be forced through holes of about one-fourth inch diameter or larger with excellent results. Again this detail may be varied in accordance with the properties of the rubber which is being reduced to particle form and in accordance with the size of the particles which may be determined upon for particular operations. The bores in the plates should be highly polished in order to facilitate the passage of the rubber. In this connection, the interior of the cylinder should likewise be polished to aid in the extrusion of the crude rubber. The die may be in other forms than the flat plate, in which case the knives would be changed to fit the die.

As the ram is advanced, the rubber will spew out of the numerous openings in the pressure plate in the string form and will be cut off as it issues by a succession of knives or other cutting implements which may be passed over the face of the pressure plate at intervals and speeds related to the speed of advance of the ram so as to cut flakes of the requisite thinness. The cutting instrumentalities may be passed at sufficiently close intervals to obtain very thin flakes of crude rubber of a few thousandths of an inch and up in thickness. The thinner the flakes, the more effective results will be secured. If the intervals of cutting are more widely spaced, the particles will assume the form of buttons, rods or sticks.

Different forms of cutting devices may be employed, but that shown here is satisfactory for the purposes. Mounted on either side of the cylinder are the pairs of sprocket wheels 20 and 21 which support and drive the parallel chains 23 from the motor 24. Pivotally mounted across these chains are the knives 25 which are spaced at requisite intervals to secure the proper cutting periods. The rear of each knife is forked, as at 25', and received over a transverse pin 25" with sufficient play to give the requisite limited rocking movement. Each knife has the forward cutting edge 26, and the arrangement is such that as the knife is advanced, the cutting action tends to force the knife against the surface of the pressure plate and a clean cut is secured. In order to hold the knife down to its work, pressure rails 28 with guiding flanges 29 are located directly over the cutting area and spaced from the face of the die by brackets 27. These rails are provided with ribs 30 against which rounded bosses 31 on the knives are adapted to bear. Before the knives reach the pressure plate, they ride upon an inclined approach 33 which guides the knives so that they will pass onto the surface of the pressure plate.

It will be appreciated that as the strings of rubber issue from the die, they will expand as shown in Fig. 2, and that as the several particles or flakes are cut off, they are moved forward by the knives until they pass off the top of the pressure plate. The freshly cut surfaces of the rubber are very tacky and immediately that two severed particles contact they will adhere, so that when a number of these particles come together they would form a cohesive, sticky mass unless means were provided to prevent this occurrence. It is possible that a number of different means may be adopted to deprive the freshly cut particles or flakes of their tackiness so that the operations would be practical, but that shown herein is satisfactory and presents many practical advantages.

Over the pressure plate, and thus over the cutting area, is provided a screen 40 which is supplied with a dusting powder. This screen may be agitated by a wheel 41 driven from the sprocket shaft and connected by a link 42. Lampblack or carbon black is used in a large number of rubber compounds and has large covering or dusting properties and, therefore, a proportion of the lampblack or carbon black which is to go into the ultimate compound may be used as a dusting agent.

In the case of light colored stocks, other dusting powders may be employed which either are neutral or are actual pigments or fillers used in the compounding. Zinc stearate, whiting, litharge or other pigments may be advantageously employed.

When the dusting operation is employed, the fine powder settles down in a thin layer over the top of the plate and over the top of the rubber as it issues from the bores in the pressure plate. This is sought to be illustrated in Fig. 2 and it will be seen that most of the surface of the rubber is covered with the powder before it is severed from the main body, and sufficient powder remains on the top of the plate or is collected by the knife to coat the remaining surfaces and no adherence of the particles can occur.

As is shown in detail in Fig. 2, the cutting and dusting operations are so regulated that there is no opportunity for the individual streams of rubber to adhere to one another before they are cut into particle form. The dusting device is coextensive with the surface of the extrusion plate so that every stream of rubber receives a thorough coating of the non-adhesive agent. By the cooperation of these elements is assured the cutting of the rubber streams into individual particles, each coated with a non-adhesive powder, and the particles never adhere or mat together.

The nature and character of the flakes which may be obtained are sought to be illustrated in Fig. 4. They are thin scales or flakes which tend to curl and be distorted in all sorts of shapes as they are cut off and resemble the usual corn flakes, although the rubber will curl and distort more markedly. Each flake is coated with a fine film of the dusting agent on all of its surfaces so that it is not adhesive or tacky.

The advancing knives scrape the particles off the plate where they fall into an inclined shaker screen 45 which removes all of the dusting material which has not adhered to the rubber, and this excess is caught up in a conveyor 46 which may return it to the shaking screen 40 for reuse.

The particles of crude rubber may be packaged at this point if desired, or placed in bins or receptacles, but I have shown a complete arrangement whereby they may be conducted directly into the mill or mixer.

For this purpose the shaker screen delivers to a chute 50 and thence to a mixing hopper where the other compounding ingredients and the balance of the pigments or fillers or lampblack may be added through pipes 52. A stirrer 53 may be mounted in the base of the hopper and the hopper discharge into a second chute 55 directly into the mixer or mill, here illustrated as the well known Banbury mixer. Other types of mills or plasticators may, of course, be employed. A valved outlet 58 at the base of the hopper may be employed to regulate the charge to be fed to the next processing machine.

It will be seen that there has been provided a new and very useful means of treating crude rubber and reducing it to minute form capable of immediate use in the subsequent processing or of storage or shipment. The labor and expense of milling crude rubber are reduced and the resultant product improved. The advantages of the fine particles or flakes of rubber are many. The term "crude unvulcanized rubber" as employed herein is intended to refer to rubber in its pre-coagulated or solid form, such as is commercially available in the form of "smoked sheets," "crepe rubber," "rolled brown" and the like, in which the rubber has been coagulated at the source and received in this country in the form which is generally recognized as "crude rubber." "Crude rubber" may be mixed with compounding ingredients or the like, but in all cases it is easily recognizable as "crude rubber" and the term is not intended to exclude the admixture of the "crude rubber" with compounding ingredients. It is not intended by the term "crude rubber" to cover herein dried latex in powdered form, as the physio-chemical characteristics of "latex" are distinct and different from "crude rubber" as the term is recognized and applied by those skilled in this art. It is believed that the product is new and that the process and apparatus improve the processing of rubber. Neither the process nor apparatus is limited to exact conformity with the details which have been shown and described.

What is claimed is:

1. The process of preparing crude unvulcanized rubber comprising forcing the rubber through a multiplicity of apertures to form filaments, directing a medium capable of rendering the surfaces of the rubber non-tacky simultaneously against all of the filaments in a direction opposite to the direction of movement of the filaments as they issue from the apertures thereby covering completely the filaments with said medium, and subdividing the covered filaments as they issue from said apertures.

2. The process of preparing crude unvulcanized rubber comprising forcing the rubber through apertures to form filaments, rendering the rubber non-tacky as it issues from the apertures by simultaneously directing a medium which is capable of rendering the rubber non-adhesive against all of the exposed surfaces of the filaments so as to coat their exposed surfaces including the leading ends thereof, and sub-dividing the filaments as they issue from the apertures before the filaments contact one another.

3. An apparatus for subdividing a body of rubber into particle form comprising a die having a plurality of apertures therein, means for forcing the rubber through the die in streams, cutting means movable across the die to sever the rubber into particles as it issues therefrom before the streams adhere to each other, and means for simultaneously applying to the entire surface of the die and to the exposed surfaces of the rubber a material capable of rendering the surfaces of the rubber non-tacky.

4. An apparatus for reducing a body of crude unvulcanized rubber into finely divided particle form comprising a die having a plurality of apertures through a surface thereof, means for forcing the rubber through the apertures in the die, a plurality of cutters movable across and in contact with the said surface of the die to shear the streams of rubber at the die surface, and means for directing a material capable of rendering the rubber non-tacky simultaneously against the entire apertured surface of the die and all of the streams of rubber issuing from the apertures, whereby said entire surface and the issuing streams of rubber will be simultaneously covered with said material.

ANDREW HALE.